United States Patent
Box

(10) Patent No.: US 10,036,497 B2
(45) Date of Patent: Jul. 31, 2018

(54) JOINT RESTRAINT DEVICES AND METHODS OF USING SAME

(71) Applicant: SIGMA CORPORATION, Cream Ridge, NJ (US)

(72) Inventor: Stuart J. Box, Cropwell, AL (US)

(73) Assignee: SIGMA CORPORATION, Cream Ridge, NJ (US)

( * ) Notice: Subject to any disclaimer, the term of this patent is extended or adjusted under 35 U.S.C. 154(b) by 422 days.

(21) Appl. No.: 14/925,352

(22) Filed: Oct. 28, 2015

(65) Prior Publication Data
US 2017/0122470 A1 May 4, 2017

(51) Int. Cl.
| | | |
|---|---|---|
| F16L 25/14 | (2006.01) | |
| F16L 21/08 | (2006.01) | |
| F16L 21/04 | (2006.01) | |
| F16L 25/08 | (2006.01) | |

(52) U.S. Cl.
CPC ............... *F16L 25/14* (2013.01); *F16L 21/04* (2013.01); *F16L 21/08* (2013.01); *F16L 25/08* (2013.01)

(58) Field of Classification Search
CPC ......... F16L 25/08; F16L 21/08; F16L 21/007; F16L 21/04
USPC ................................................ 285/342, 413
See application file for complete search history.

(56) References Cited

U.S. PATENT DOCUMENTS

| | | | |
|---|---|---|---|
| 817,300 A | | 4/1906 | David |
| 1,146,670 A | | 7/1915 | Tippett |
| 1,242,380 A | * | 10/1917 | Skinner ................... F16L 21/08 138/99 |
| 1,423,754 A | | 7/1922 | James |
| 1,600,561 A | * | 9/1926 | O'Connor ............. F16L 15/008 285/148.6 |
| 2,052,394 A | | 8/1936 | Fullman |
| 3,148,902 A | | 9/1964 | Gardner et al. |
| 3,333,872 A | * | 8/1967 | Crawford, Sr. ......... F16L 21/08 285/374 |
| 3,726,549 A | * | 4/1973 | Bradley, Jr. ............. F16L 21/04 285/356 |
| 3,920,270 A | | 11/1975 | Babb, Jr. |
| 3,941,410 A | * | 3/1976 | Miyaoka .................. F16L 21/04 285/321 |
| 4,092,036 A | | 5/1978 | Sato et al. |
| 4,397,485 A | | 8/1983 | Wood |

(Continued)

FOREIGN PATENT DOCUMENTS

WO   WO-2004085905 A1 * 10/2004   ............ F16L 13/147

*Primary Examiner* — David Bochna
(74) *Attorney, Agent, or Firm* — Ballard Spahr LLP

(57) ABSTRACT

A joint restraint for deforming an outer diameter of a pipe for insertion into a socket. The joint restraint can selectively mount to a portion of an irregularly shaped pipe having a maximum outer diameter that differs from a desired substantially constant outer diameter. The joint restraint can have a circumferential ring body surrounding a central axis. A plurality of jacking assemblies can be secured to a portion of the ring body. Each jacking assembly can have a frame and a jacking bolt. The frame can have a threaded aperture that can receive the jacking bolt. Each jacking bolt can be selectively actuatable for radial movement relative to the central axis to deform the pipe proximate the maximum outer diameter of the pipe by selectively urging an outer surface of the pipe to the desired substantially constant outer diameter.

19 Claims, 4 Drawing Sheets

(56) References Cited

U.S. PATENT DOCUMENTS

| | | |
|---|---|---|
| 4,417,754 A | 11/1983 | Yamaji et al. |
| 4,438,954 A | 3/1984 | Hattori |
| 4,540,199 A | 9/1985 | Neill |
| 4,544,188 A | 10/1985 | Dugger |
| 4,568,112 A | 2/1986 | Bradley, Jr. et al. |
| 4,647,083 A | 3/1987 | Hashimoto |
| 4,660,266 A | 4/1987 | Horn |
| D294,384 S | 2/1988 | Endo et al. |
| 4,779,900 A | 10/1988 | Shumard |
| 4,819,974 A | 4/1989 | Zeidler |
| 4,848,808 A * | 7/1989 | Pannell ............... F16L 21/08 285/337 |
| 4,896,903 A | 1/1990 | Shumard |
| 4,940,259 A | 7/1990 | Williams |
| 5,060,989 A | 10/1991 | Gallucci et al. |
| 5,071,175 A | 12/1991 | Kennedy, Jr. |
| 5,224,741 A | 7/1993 | Burkit et al. |
| 5,288,108 A | 2/1994 | Eskew et al. |
| 5,441,082 A | 8/1995 | Eskew et al. |
| 5,509,699 A | 4/1996 | Himmelberger |
| 5,544,922 A | 8/1996 | Shumard et al. |
| 5,772,252 A | 6/1998 | Malani |
| 5,992,905 A | 11/1999 | Kennedy, Jr. et al. |
| 6,065,784 A | 5/2000 | Lundstrom |
| 6,106,031 A | 8/2000 | Guginsky |
| 6,173,993 B1 * | 1/2001 | Shumard ............... F16L 25/065 285/337 |
| 6,322,273 B1 * | 11/2001 | Gentile, Jr. ........... F16L 23/032 285/337 |
| 6,739,631 B2 * | 5/2004 | Smith .................... F16L 21/08 285/337 |
| D513,793 S | 1/2006 | Copeland et al. |
| D514,669 S | 2/2006 | Copeland et al. |
| D515,673 S | 2/2006 | Copeland et al. |
| 7,185,924 B1 * | 3/2007 | Longacre .............. F16L 25/065 285/404 |
| 7,225,837 B1 | 6/2007 | Kane |
| 7,266,875 B2 | 9/2007 | Longacre et al. |
| 7,341,288 B2 * | 3/2008 | Lundstrom ........... F16L 21/007 285/421 |
| D593,642 S | 6/2009 | Copeland et al. |
| 7,647,947 B1 | 1/2010 | Littlebrant |
| D620,086 S | 7/2010 | Copeland et al. |
| 7,997,628 B1 | 8/2011 | Smith, Jr. et al. |
| 8,308,202 B2 | 11/2012 | Bekki |
| 8,459,941 B2 | 6/2013 | Jasko et al. |
| 8,904,621 B2 | 12/2014 | Patterson et al. |
| 8,973,244 B2 | 3/2015 | LaValley et al. |
| 2012/0049515 A1 | 3/2012 | Hietpas |

\* cited by examiner

JOINT RESTRAINT DEVICES AND METHODS OF USING SAME

FIELD

Disclosed herein is a joint restraint with a feature for reshaping an outer diameter of a pipe. In exemplary aspects, the disclosed feature of the joint restraint can be used to re-shape a pipe for complementary insertion into a socket.

BACKGROUND

In the pipeline industry, there are often situations where the outer diameter of a pipe needs to be reshaped to ensure complementary engagement with a fitting, a coupling, or other pipe element. Conventionally, pipes having an undesired outer diameter are reshaped using a pipe processing tool. After a pipe is deformed to a desired shape using the pipe processing tool, the pipe is removed from the tool and secured to a fitting, a pipe, or other pipe element. For example, the reshaped pipe can be coupled to another pipe using a joint restraint. Thus, the deformation and reshaping of the pipe and the coupling of the reshaped pipe to another pipe element are conventionally accomplished using different tools (e.g., a pipe processing tool and a joint restraint tool). This need for two separate tools can create significant inefficiency in the overall process of coupling a pipe having an undesired shape to another pipe element.

Consequently, there is a need for devices and methods that improve the efficiency of the pipe coupling process. In particular, there is a need for devices and methods that efficiently reshape a pipe and couple the reshaped pipe to another pipe element, such as a fitting or another pipe.

SUMMARY

Described herein, in various aspects, is the feature of joint restraint. The joint restraint can be configured to selectively mount to a portion of a pipe. The pipe can be irregularly shaped and can have a maximum outer diameter that differs from a desired substantially constant outer diameter that is configured for receipt within a socket. The joint restraint can have a circumferential ring body surrounding a central axis. The joint restraint can have an inner surface, an opposed outer surface, and opposed first and second surfaces that extend between the respective inner and outer surfaces. The inner surface of the ring body can define an inner diameter that is greater than the maximum outer diameter of the pipe. The ring body can define a plurality of bores (optionally, threaded bores) that can extend radially between the inner and outer surfaces relative to the central axis. The joint restraint can have a plurality of bolts. Each bore of the ring body can be configured to receive a respective bolt of the plurality of bolts. Each bolt can be configured for selective radial movement relative to the central axis to apply a mechanical load to an outer surface of the pipe. The joint restraint can have a plurality of jacking assemblies that are secured to a portion of the first surface of the ring body. Each jacking assembly can have a frame and a jacking bolt. The frame of each jacking assembly can define an aperture (optionally, a threaded aperture) that can extend radially relative to the central axis. The aperture of the frame of each jacking assembly can be configured to receive a jacking bolt of the jacking assembly. The jacking bolt can be selectively radially moveable relative to the central axis to deform the pipe proximate the maximum outer diameter of the pipe to selectively urge an outer surface of the pipe to the desired substantially constant outer diameter.

In use, the joint restraint can be positioned onto an outer surface of the pipe proximate the maximum diameter of the pipe. Optionally, a gasket can be positioned onto at least a distal end portion of the pipe. The jacking bolt of each jacking assembly can be positioned within the aperture of the frame of the jacking assembly, and each jacking bolt can be selectively moved radially inwardly relative to the central axis to deform the pipe proximate the maximum outer diameter of the pipe to urge an outer surface of the pipe to the desired substantially constant outer diameter. Once the desired outer diameter has been achieved, at least a portion of the distal end portion of the pipe can be inserted into the socket. Additionally, at least a portion of the gasket can also be inserted into the socket. Each bolt of the plurality of bolts can be selectively moved radially inwardly relative to the central axis to transmit force to the outer surface of the pipe. Optionally, the joint restraint can be secured or otherwise coupled to the pipe element defining the socket using fasteners that extend through slots defined by the ring body of the joint restraint.

DESCRIPTION OF THE DRAWINGS

These and other features of the preferred embodiments of the invention will become more apparent in the detailed description in which reference is made to the appended drawings wherein.

DETAILED DESCRIPTION

Figure 1:
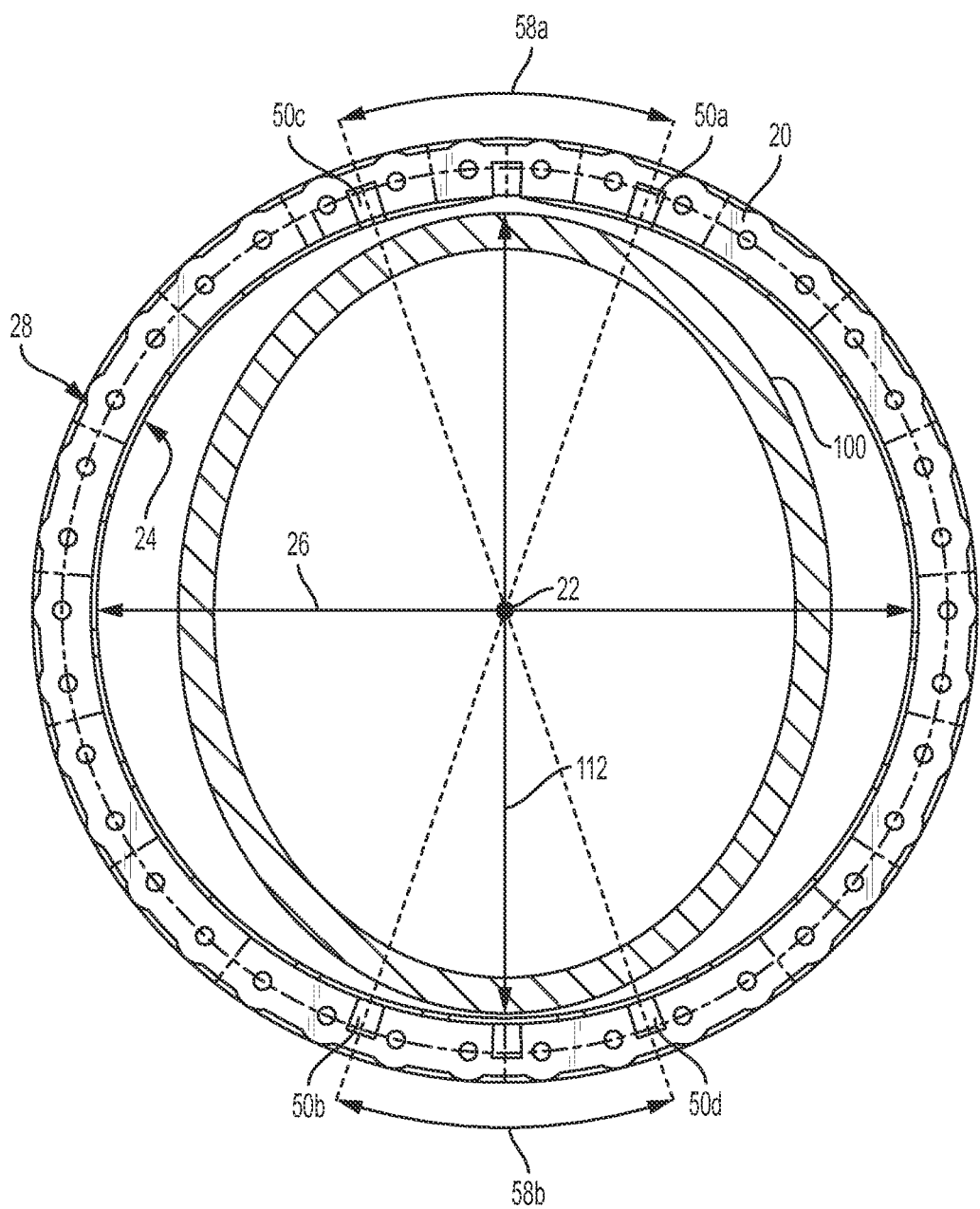
FIG. 1 is an end view of an exemplary joint restraint device as disclosed herein. As shown, an out-of-round pipe can be positioned within the joint restraint device.

The present invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout. It is to be understood that this invention is not limited to the particular methodology and protocols described, as such may vary. It is also to be understood that the terminology used herein is for the purpose of describing particular embodiments only, and is not intended to limit the scope of the present invention.

Many modifications and other embodiments of the invention set forth herein will come to mind to one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

As used herein the singular forms "a", "an", and "the" include plural referents unless the context clearly dictates otherwise. For example, use of the term "a bolt" can refer to one or more of such bolts unless the context indicates otherwise.

All technical and scientific terms used herein have the same meaning as commonly understood to one of ordinary skill in the art to which this invention belongs unless clearly indicated otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

The word "or" as used herein means any one member of a particular list and also includes any combination of members of that list.

Described herein, with reference to FIGS. 1-4, is a joint restraint 10. In various aspects, the joint restraint 10 can be configured to selectively mount to a portion of a pipe 100. In these aspects, the pipe 100 can be irregularly shaped and can have a maximum outer diameter 112 that differs from a desired substantially constant outer diameter 114 that can be configured for receipt within a socket 120.

Figure 2:
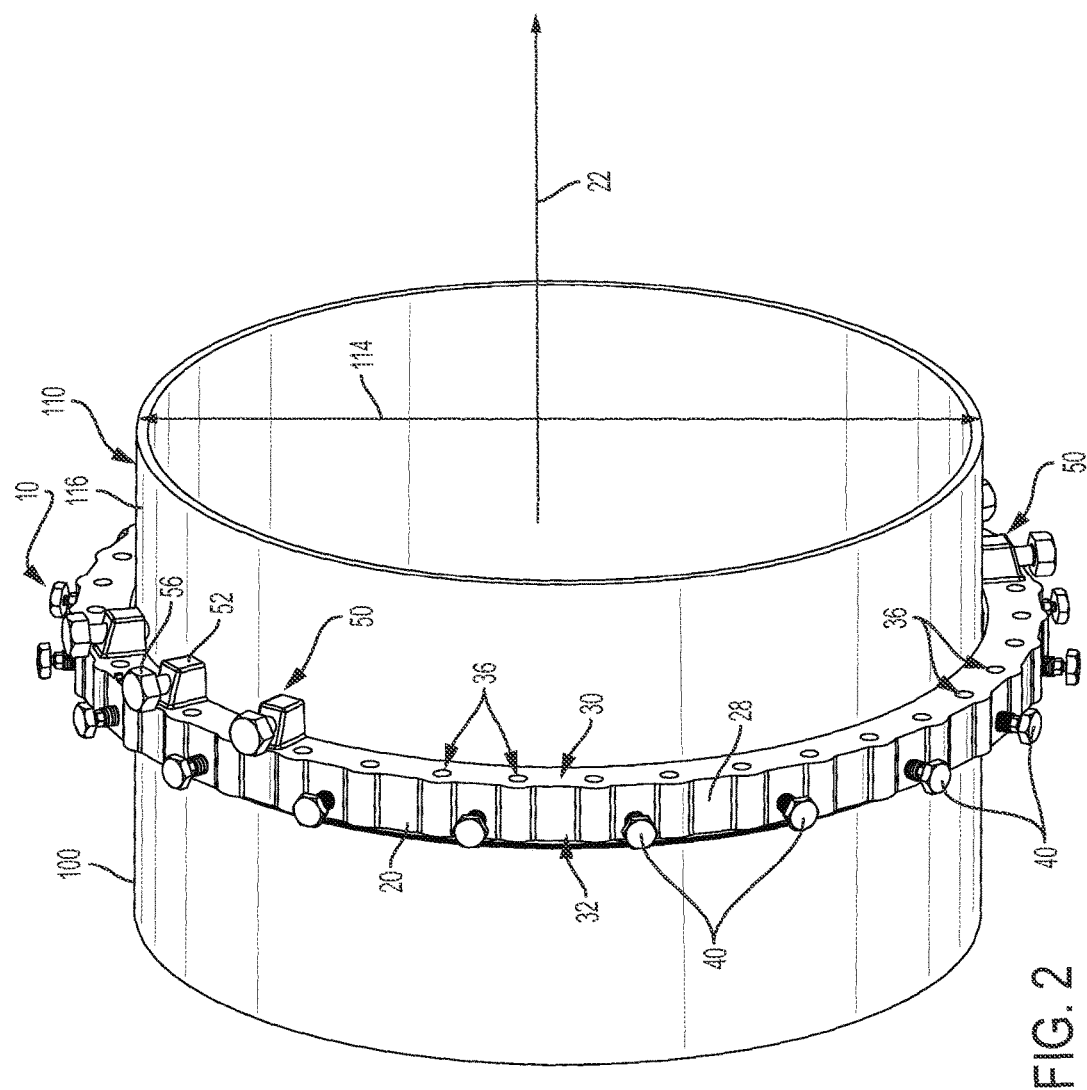
FIG. 2 is a side perspective view of an exemplary joint restraint device as disclosed herein. As shown, the joint restraint device has features that can reshape a pipe within the joint restraint device to a desired outer diameter.

In exemplary aspects, and with reference to FIGS. 1-2, the joint restraint 10 can comprise a circumferential ring body 20 that surrounds a central axis 22. In these aspects, the ring body 20 can have an inner surface 24, an opposed outer surface 28, and opposed first and second surfaces 30, 32 that can extend between the respective inner and outer surfaces 24, 28. As used herein, the term "circumferential" indicates that the ring body 20 extends 360 degrees around (completely surrounds) the central axis 22. Optionally, in exemplary aspects, the ring body 20 can have substantially circular or rounded inner and outer surfaces 24, 28. As shown in FIG. 1, it is contemplated that the inner surface 24 of the ring body 20 can define an inner diameter 26 that is greater than the maximum outer diameter 112 of the pipe 100.

In additional aspects, the ring body 20 can define a plurality of bores 34 that extend radially between the inner and outer surfaces 24, 28 relative to the central axis 22. In these aspects, it is contemplated that at least a portion of each bore of the plurality of bores 34 can be threaded. In further aspects, the plurality of bores 34 can be spaced circumferentially about the opposed inner and outer surfaces 24, 28 of the ring body 20. In other aspects, the ring body 20 can define a plurality of slots 36 that can extend between first and second surfaces 30, 32 of the ring body 20. In these aspects, the plurality of slots 36 can be spaced circumferentially about the opposed first and second surfaces 30, 32 of the ring body. As shown in FIG. 2, it is contemplated that each slot of the plurality of slots 36 can be circumferentially offset from adjacent bores 34 of the ring body 20. Optionally, each slot of the plurality of slots 36 can be configured to receive a corresponding fastener 80 of another pipe element. For example, in exemplary aspects, the plurality of slots can be configured to receive corresponding fasteners 80 that are operatively coupled to a fitting or pipe that defines a socket as further disclosed herein.

Figure 3:
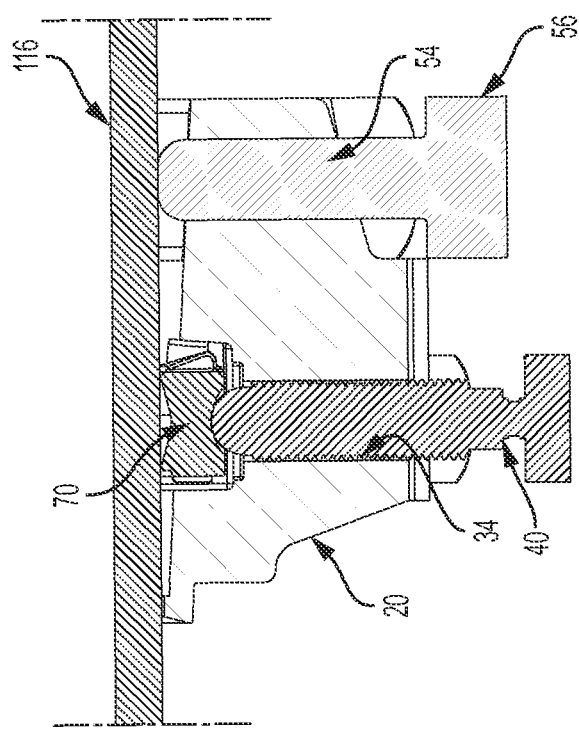
FIG. 3 is a close-up cross-sectional side view of an exemplary joint restraint device having features for re-shaping a pipe as disclosed herein.

In other exemplary aspects, and with reference to FIGS. 2-3, the joint restraint 10 can comprise a plurality of bolts 40. In these aspects, each bore 34 of the ring body 20 can be configured to receive a respective bolt of the plurality of bolts 40. Optionally, at least a portion of each bolt 40 can be threaded and configured for engagement with a corresponding threaded portion of a bore 34. It is contemplated that, in use, each bolt 40 can be configured for selective radial movement relative to the central axis 22 to apply a mechanical load to the outer surface 110 of the pipe 100. In exemplary aspects, it is contemplated that the bolts 40 can include one or more features to limit the maximum torque that can be applied by the bolt. Exemplary torque-limiting features are disclosed in U.S. Pat. No. 7,266,875, entitled "Joint Restraint Assembly," which is incorporated by reference herein in its entirety.

In another exemplary aspect, and with reference to FIGS. 2-3, the joint restraint 10 can comprise a plurality of jacking assemblies 50. In this aspect, the jacking assemblies 50 can be secured to a portion of the first surface 30 of the ring body 20. Optionally, the plurality of jacking assemblies 50 can be integrally formed to a portion of the first surface 30 of the ring body 20. In one aspect, each jacking assembly 50 can have a frame 52 and a jacking bolt 56. In this aspect, the frame 52 can define an aperture 54 that extends radially relative to the central axis 22 and can be configured to receive at least a portion of the jacking bolt 56. In exemplary aspects, the aperture 54 and the jacking bolt 56 can have complementary threaded portions that are configured for threaded engagement with one another. In operation, the jacking bolt 56 can be selectively radially moveable relative to the central axis 22 to deform the pipe 100 proximate the maximum outer diameter 112 of the pipe and to selectively urge the outer surface 110 of the pipe to the desired substantially constant outer diameter 114. Following deformation of the pipe 100 in a desired manner, the jacking bolts 56 can be radially withdrawn from the outer surface 110 of the pipe. As shown in FIGS. 2-3, it is contemplated that the bores 34 and apertures 54 of the ring body 20 can be generally oriented toward the central axis 22.

In one aspect, and with reference to FIG. 1, the plurality of jacking assemblies 50 can comprise at least one pair of opposed jacking assemblies. It is contemplated that the at least one pair of opposed jacking assemblies 50 can comprise a plurality of pairs of opposed jacking assemblies. In another aspect, the jacking assemblies 50 of each pair of opposed jacking assemblies can be positioned in circumferential opposition to one another about the circumferential ring body 20. In this aspect, each pair of opposed jacking assemblies 50 can comprise a first jacking assembly 50a, 50c and an opposed second jacking assembly 50b, 50d. In exemplary aspects, the first jacking assemblies 50a, 50c of the plurality of pairs of opposed jacking assemblies 50 can be spaced along a first arc segment 58a of the ring body 20 that defines a central angle with the central axis 22. Optionally, in these aspects, the central angle corresponding to the first arc segment 58a can be less than 45 degrees and, more preferably, range from about 10 degrees to about 35 degrees. In further exemplary aspects, the second jacking assemblies 50b, 50d of the plurality of pairs of opposed jacking assemblies 50 can be spaced along a second arc segment 58b of the ring body 20 that defines a central angle with the central axis 22. Optionally, in these aspects, the central angle corresponding to the second arc segment 58b can be less than 45 degrees and, more preferably, range from about 10 degrees to about 35 degrees. In further optional aspects, it is contemplated that the central angles defined by the first and second arc segments 58a, 58b can be substantially equal.

Optionally, in further aspects, the joint restraint 10 can comprise a gasket 60, such as a mechanical joint gasket as is known in the art. In these aspects, the gasket 60 can be configured to be positioned onto a portion of the pipe 100, such as, for example, a distal end portion of the pipe as further disclosed herein.

In another aspect, the joint restraint 10 can comprise a plurality of inserts 70. In this aspect, each insert of the plurality of inserts 70 can be configured for receipt within a respective bore of the plurality of bores 34 of the ring body 20. It is contemplated that each insert 70 can be positioned in communication with the outer surface of the pipe 100. In a further aspect, each bolt of the plurality of bolts 40 can be configured to apply a mechanical load to a corresponding insert 70 to transmit force to the outer surface 110 of the pipe 100.

Optionally, in exemplary aspects, the inserts 70 can have features or characteristics of the segments disclosed in U.S. Pat. No. 7,266,875, entitled "Joint Restraint Assembly," which is incorporated by reference herein in its entirety. For example, it is contemplated that the inserts 70 can be configured to be pre-loaded against the outer surface 110 of the pipe 100 to make an indentation in the outer surface of the pipe. More particularly, when a specified torque is applied to the bolts 40 at the time of assembly, the force developed by the bolt can pre-load the inserts 70 against the pipe 100. Mechanical and/or pressure loading, tending to pull the pipe out of the restraint assembly, can cause relative movement between the pipe and the restraint assembly. This relative movement can cause the insert 70 to firmly contact an interior corner of the cavity, and the application of increasing load and the associated relative movement can cause the insert to rotate resulting in a proportional increase to the force engaging the insert to the pipe. This action of the insert is herein referred to as self-actuating. It should also be understood that subsequent reference to "mechanical and/or pressure loading" hereinafter includes the relative movement between the pipe and the joint restraint assembly that occurs as a result of the application of the mechanical and/or pressure loading. It should be further understood that this relative movement is not to be confused with slippage of the restraint assembly along the surface of the pipe.

As further disclosed herein, the inserts 70 can be configured to contact the outer surface 110 of the pipe 100. The inserts 70 can function in a manner similar to a cam, pawl, dog, or other self-actuating member, and they can optionally possess a surface treatment (e.g., a knurled surface) intended to reduce the likelihood of slipping on the pipe surface. To minimize the likelihood of slipping on the pipe surface, the inserts 70 can optionally be configured with one or more edges capable of penetrating the external surface of the pipe. It is contemplated that each edge of the inserts 70 can be circumferentially contoured to approximately match the curvature of the pipe. The inserts, and each edge thereon, can be of sufficient circumferential length to distribute the applied loading over a substantial portion of the pipe periphery. The inserts can possess a form wherein the application of mechanical loading or pipe internal pressure causes the corner of the insert to contact an interior corner of the bore to serve as a pivot for the insert. As a result, the loading transmitted from the pipe through the edge of the insert can be transmitted to the corner of the insert in contact with the interior corner of the bore. Accordingly, the loading from the edge of the insert, through the insert, to the corner contact location can produce a state of stress in the insert that is primarily compressive. Transmitting the loading in this manner can minimize the tendency of the insert material to fracture. The relief angle adjacent to each edge of the insert, as measured from the pipe surface, can be optimized to maximize the load transmission capability from the insert edge into the insert body while permitting the insert edge to penetrate the pipe surface sufficiently to prevent slippage of the joint restraint assembly relative to the pipe.

With this exemplary insert configuration, the function of the bolt can be reduced to pre-loading the insert against the pipe surface, at the time of assembly, sufficiently to resist handling loads and low levels of internal pipe pressure. Upon the application of sufficient mechanical and/or internal pressure loading, a corner of the insert can be caused to firmly contact an interior corner of the bore, and the continued application of mechanical and/or internal pressure loading can cause additional rotation of the insert between the interior corner of the bore and the pipe surface. In doing so, the insert performs in a self-actuating manner where the force tending to cause the insert edge to penetrate deeper into the pipe surface is proportional to the increase in mechanical and/or internal pressure loading. Accordingly, the entire length of the insert edge is caused to penetrate deeper into the pipe surface as required to resist the applied loading, well beyond the penetration achievable from the force applied by the bolt alone or any prior art arrangement. Thus, the bolt (e.g., threaded bolt) does not contribute to securing the joint restraint assembly onto the pipe during higher levels of loading.

The self-actuating function of the insert can produce internal force vectors with, in part, force vector components parallel to the surface of the pipe that resist movement due to the mechanical and/or internal pressure loading on the pipe tending to pull the pipe out of the joint restraint assembly. The slots defined by the ring body can optionally be substantially equally spaced around the ring body, and a plurality of connecting fasteners can be installed through the slots to secure the joint restraint assembly to another restraint assembly or another object. It is contemplated that the difference in the radial positions of the force vector component parallel to the surface of the pipe, applied to the interior corner of the bore, and the axial restraint force of the connecting fasteners can be small in comparison to conventional joint restraint assemblies.

The force vectors internal to the insert, produced by its self-actuating function, can also have force vector components that are perpendicular to the pipe surface, and this vector component applied at the edge of the insert can force the insert edge to penetrate the surface of the pipe. The corresponding force vector component perpendicular to the pipe surface, applied to the interior corner of the cavity, can substantially add to the loading applied radially to the joint restraint body. Accordingly, the configuration of the body can be optimized to resist this additional loading and the tendency of the body to roll about an axis through its cross-sectional center of area.

Optionally, elastomeric material can be installed between each end of the insert and the corresponding walls of the bore in order to retain the insert in position for shipping, handling and installation. Elastomeric material can also be installed between one face of the insert and its corresponding wall of the bore in order to pre-position the insert against the opposite wall of the cavity. Accordingly, the insert can be pre-positioned for appropriately making contact with the interior corner of the bore and the pipe surface, as pre-loaded by the bolt, so as to establish the self-actuating position of the insert.

In use, it is contemplated that the disclosed joint restraint assembly 10 can be configured to fit pipes of any size or material, and to join or attach to any other type of restraint, sealing assembly or other object. The joint restraint assembly can be made from any suitable material or combination of suitable materials. For example, at least a portion of the joint restraint 10 can be made from ductile iron.

In operation, it is contemplated that the jacking bolts 56 of the disclosed joint restraint 10 can reshape an outer diameter of a pipe 100 to allow for insertion of the pipe into a socket 120. In exemplary aspects, the pipe 100 can be irregularly shaped and can have an outer diameter with a maximum outer diameter 112 that differs from a desired substantially constant outer diameter 114 that can be configured for receipt within a socket 120. It is contemplated that the joint restraint 10 can be positioned onto an outer surface 110 of the pipe 100 proximate the maximum diameter of the pipe, in exemplary aspects, a gasket 60 can be positioned onto a portion of the pipe 100, such as, for example, a distal end portion 116 of the pipe. In other exemplary aspects, the jacking bolt 56 of each jacking assembly 50 can be positioned within the aperture 54 of the frame 52 of the jacking assembly, and each jacking bolt 56 can be selectively moved radially inwardly relative to the central axis 22 to deform the pipe 100 proximate the maximum outer diameter 112 of the pipe, thereby urging an outer surface 110 of the pipe to the desired substantially constant outer diameter 114. Once the desired outer diameter has been achieved, at least a portion of the distal end portion 116 of the pipe 100 can be inserted into the socket 120. In exemplary aspects, the jacking bolts 56 can be located and activated at or proximate to the maximum diameter of the pipe to allow the pipe to be inserted into the socket as further disclosed herein. Optionally, the joint restraint 10 can be placed between about 1 to about 10 inches from a distal end of the pipe 100. In these aspects, at least a portion of the gasket 60 can be inserted into the socket 120. It is contemplated that each bolt of the plurality of bolts 40 can be selectively moved radially inwardly relative to the central axis 22 to transmit force to the outer surface 110 of the pipe 100.

As described herein, the ring body 20 of the joint restraint 10 can define a plurality of slots 36 that can extend between the opposed first and second surfaces 30, 32 of the ring body 20. In operation, a fastener 80 can be positioned within at least one slot of the plurality of slots 36. Optionally, a fastener 80 can be positioned within each respective slot of the plurality of slots 36. As further disclosed herein, each fastener can have a first end portion positioned within a respective slot 36 and an opposed end portion positioned within or otherwise operatively associated with another restraint apparatus, pipe element, or other object, thereby stabilizing and coupling the joint restraint 110 and the other object.

In another aspect, the socket 120 can be defined by a pipe element selected from the group consisting of a pipe, a fitting, or joint restraint apparatus. It is contemplated that at least a portion of the gasket 60 can be positioned between the circumferential ring body 20 and a portion of the pipe element defining the socket 120, such as, for example, a flange portion of a pipe element, restraint device, or fitting. It is further contemplated that, in operation, the fastener 80 can be advanced within each respective slot of the plurality of slots 36 to compress the gasket 60 between the circumferential ring body 20 and the pipe element. Exemplary non-limiting fastener configurations for connecting the joint restraint 10 to another object are disclosed in U.S. Pat. No. 3,333,872 (Crawford, Sr. et al.); U.S. Pat. No. 3,726,549 (Bradley, Jr.); U.S. Pat. No. 4,848,808 (Pannell et al.); and U.S. Pat. No. 4,779,900 (Shumard.), each of which is incorporated herein by reference in its entirety.

In yet another aspect, as described herein, the joint restraint 10 can comprise a plurality of inserts 70. In use, each insert of the plurality of inserts 70 can be positioned within a respective bore of the plurality of threaded bores 34 of the ring body 20. In a further aspect, each bolt of the plurality of bolts 40 can be moved radially inwardly relative to the central axis 22 to apply a mechanical load to a corresponding insert 70 to transmit force to the outer surface 110 of the pipe 100.

In still another aspect, the pipe 100 can have a minimum outer diameter that differs from a desired substantially constant outer diameter 114. In this aspect, the deformation of the pipe 100 proximate the maximum outer diameter 112 of the pipe can urge the outer surface 110 of the pipe proximate the maximum outer diameter to the desired substantially constant outer diameter 114, and the deformation of the pipe proximate the minimum outer diameter of the pipe can urge the outer surface of the pipe proximate the minimum outer diameter to the desired substantially constant outer diameter.

Figure 4:
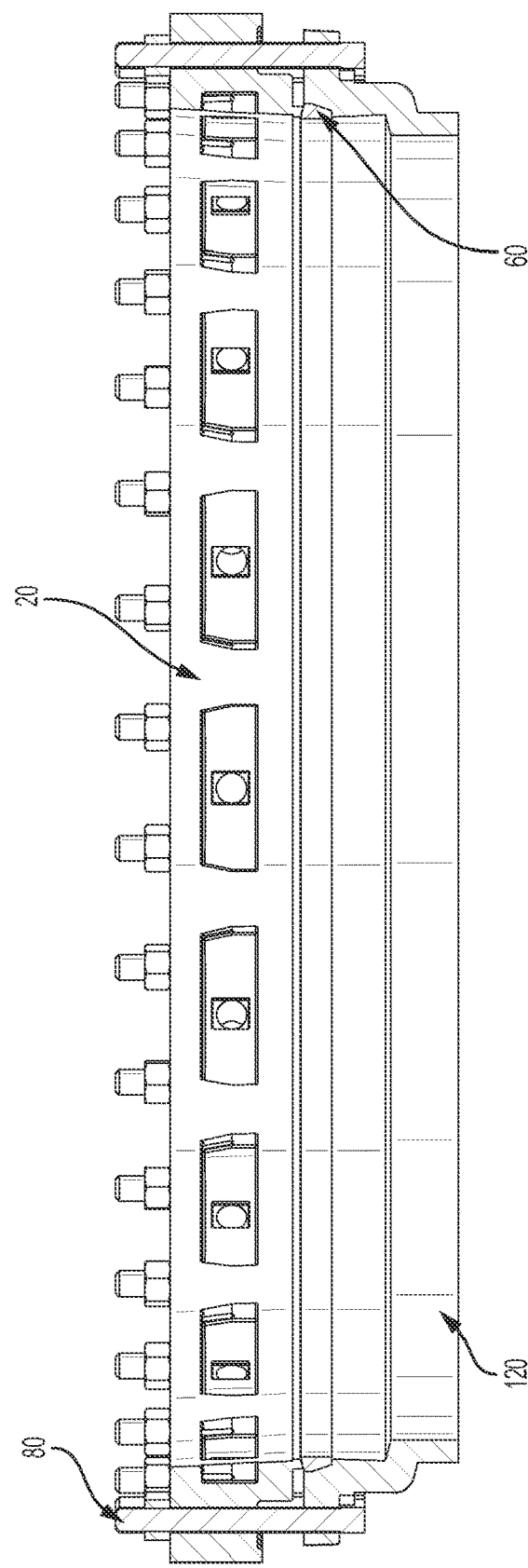
FIG. 4 depicts a partial cross-sectional top view of the position of a socket and a joint restraint when a distal end of a reshaped pipe is positioned within the socket as disclosed herein. For clarity, the reshaped pipe is not depicted in the figure. As shown, a portion of the gasket can be compressed between the disclosed joint restraint and another object. As further disclosed herein, it is contemplated that a portion of a gasket can be positioned between the outer diameter of the distal end of the pipe and the inner surface of the socket.

In exemplary aspects, and with reference to FIGS. 2-4, a worker can identify the largest dimension (maximum outer diameter) across a pipe. In these aspects, the ring body of the joint restraint can be positioned on the pipe such that the jacking bolts are in substantial alignment with the largest dimension (maximum outer diameter) of the pipe. It is contemplated that the ring body should be between about 1 inch and about 10 inches (more preferably, between about 6 inches and 8 inches) from an end of the pipe. In operation, if the ring body will not fit over the pipe, then it can be appreciated that the pipe is outside the allowable tolerance of the joint restraint. After the ring body is positioned appropriately on the pipe, the gasket 60 can be positioned over a portion of the end of the pipe. With the ring body centered about the outer surface of the pipe, the jacking bolts 56 can be radially advanced (e.g., tightened) until the pipe is deformed to a diameter that is within the tolerance for insertion into a socket. The end of the pipe can then be inserted into the socket, and the gasket 60 can be positioned (e.g., pushed) in place within the socket. With the end of the pipe received within the socket, the bolts 40 can be hand-tightened (or otherwise lightly tightened) against the outer surface of the pipe. Following tightening of bolts 40, the jacking bolts 56 can be loosened and/or disengaged from the pipe. As shown in FIG. 4, the ring body can then be positioned within (e.g., pulled into) the socket. In exemplary aspects, as further disclosed herein, the gasket 60 can be compressed between corresponding surfaces of the joint restraint and another object, such as a fitting, a pipe element, or another joint restraint. In these aspects, the joint restraint and the other object can be connected together by fasteners (e.g., T-head bolts) 80 as disclosed herein to thereby compress a portion of the gasket 60. Following connection between the joint restraint and the other object, the bolts 40 can be selectively radially advanced to activate wedge-action restraining capabilities of the joint restraint in a conventional manner.

Exemplary Aspects

In various exemplary aspects, disclosed herein is a joint restraint configured to selectively mount to a portion of a pipe, wherein the pipe is irregularly shaped and has a maximum outer diameter that differs from a desired substantially constant outer diameter that is configured for receipt within a socket, the joint restraint comprising: a circumferential ring body surrounding a central axis and having an inner surface, an opposed outer surface, and opposed first and second surfaces that extend between the respective inner and outer surfaces, wherein the inner surface of the ring body defines an inner diameter that is greater than the maximum outer diameter of the pipe, and wherein the ring body defines a plurality of bores that extend radially between the inner and outer surfaces relative to the central axis; a plurality of bolts, wherein each bore of the ring body is configured to receive a respective bolt of the plurality of bolts, wherein each bolt is configured for selective radial movement relative to the central axis to apply a mechanical load to an outer surface of the pipe; a plurality of jacking assemblies secured to a portion of the first surface of the ring body, each jacking assembly comprising: a frame defining an aperture that extends radially relative to the central axis; and a jacking bolt, wherein the aperture of the frame is configured to receive the jacking bolt, wherein the jacking bolt is selectively radially moveable relative to the central axis to deform the pipe proximate the maximum outer diameter of the pipe to selectively urge an outer surface of the pipe to the desired substantially constant outer diameter.

In another exemplary aspect, the plurality of jacking assemblies comprises at least one pair of opposed jacking assemblies, and the jacking assemblies of each pair of opposed jacking assemblies are positioned in circumferential opposition to one another about the circumferential ring body.

In another exemplary aspect, the at least one pair of opposed jacking assemblies comprises a plurality of pairs of opposed jacking assemblies.

In another exemplary aspect, each pair of opposed jacking assemblies comprises a first jacking assembly and an opposed second jacking assembly, wherein the first jacking assemblies of the plurality of pairs of opposed jacking assemblies are spaced along a first arc segment of the ring body that defines a first central angle at the central axis of the ring body, wherein the second jacking assemblies of the plurality of pairs of opposed jacking assemblies are spaced along a second arc segment of the ring body that defines a second central angle at the central axis of the ring body, and wherein the first and second central angles are less than about 45 degrees.

In another exemplary aspect, the plurality of jacking assemblies are integrally formed to a portion of the first surface of the ring body.

In another exemplary aspect, the ring body defines a plurality of slots that extend between the opposed first and second surfaces of the ring body, and each slot of the plurality of slots is configured to receive a corresponding fastener. In another exemplary aspect, the plurality of slots are spaced circumferentially about the opposed first and second surfaces.

In another exemplary aspect, the plurality of bores are spaced circumferentially about the opposed inner and outer surfaces.

In another exemplary aspect, the joint restraint further comprises a gasket (e.g., a mechanical joint gasket) configured to be positioned onto the pipe.

In another exemplary aspect, the joint restraint further comprises a plurality of inserts, wherein each insert of the plurality of inserts is configured for receipt within a respective bore of the plurality of bores of the ring body, and wherein each bolt of the plurality of bolts is configured to apply a mechanical load to a corresponding insert to transmit force to the outer surface of the pipe.

In various exemplary aspects, disclosed herein is a method for deforming an outer diameter of an irregularly shaped pipe for insertion into a socket, comprising: positioning a joint restraint onto an outer surface of the pipe proximate a maximum outer diameter of the pipe, wherein the maximum outer diameter of the pipe differs from a desired substantially constant outer diameter that is configured for receipt within a socket, the joint restraint comprising: a circumferential ring body surrounding a central axis and having an inner surface, an opposed outer surface, and opposed first and second surfaces that extend between the respective inner and outer surfaces, wherein the inner surface of the ring body defines an inner diameter that is greater than the maximum outer diameter of the pipe, and wherein the ring body defines a plurality of bores that extend radially between the inner and outer surfaces relative to the central axis; a plurality of bolts; a plurality of jacking assemblies secured to a portion of the first surface of the ring body, each jacking assembly comprising: a frame defining an aperture that extends radially relative to the central axis; and a jacking bolt; positioning a gasket onto at least a portion of the pipe; positioning the jacking bolt of each jacking assembly within the aperture of the frame of the jacking assembly; selectively moving the jacking bolt of each jacking assembly radially inwardly relative to the central axis to deform the pipe proximate the maximum outer diameter of the pipe to urge an outer surface of the pipe to the desired substantially constant outer diameter; inserting a distal end portion of the pipe into the socket; positioning at least a portion of the gasket within the socket; and selectively moving each bolt of the plurality of bolts radially inwardly relative to the central axis to transmit force to the outer surface of the pipe.

In further exemplary aspects, the distal end portion of the pipe defines a distal end of the pipe, and the joint restraint is placed between about 1 to about 10 inches from the distal end of the pipe.

In further exemplary aspects, the plurality of jacking assemblies comprises at least one pair of opposed jacking assemblies, and the jacking assemblies of each pair of opposed jacking assemblies are positioned in circumferential opposition to one another about the circumferential ring body. In further exemplary aspects, the at least one pair of opposed jacking assemblies comprises a plurality of pairs of opposed jacking assemblies.

In further exemplary aspects, the socket is defined by a pipe element selected from the group consisting of a pipe and a fitting.

In further exemplary aspects, the ring body defines a plurality of slots that extend between the opposed first and second surfaces of the ring body, and the method further comprises positioning a fastener within each respective slot of the plurality of slots. In further exemplary aspects, the socket is defined by a pipe element selected from the group consisting of a pipe and a fitting, at least a portion of the gasket is positioned between the circumferential ring body and a portion of the pipe element defining the socket, and the method further comprises advancing the fastener within each respective slot of the plurality of slots to compress the gasket between the circumferential ring body and the pipe element.

In further exemplary aspects, the joint restraint further comprises a plurality of inserts, and the method further comprises positioning each insert of the plurality of inserts within a respective bore of the plurality of bores of the ring body, wherein each bolt of the plurality of bolts is moved radially inwardly relative to the central axis to apply a mechanical load to a corresponding insert to transmit force to the outer surface of the pipe.

In further exemplary aspects, the pipe has a minimum outer diameter that differs from a desired substantially constant outer diameter, the deformation of the pipe proximate the maximum outer diameter of the pipe urges the outer surface of the pipe proximate the maximum outer diameter to the desired substantially constant outer diameter, and the deformation of the pipe proximate the minimum outer diameter of the pipe urges the outer surface of the pipe proximate the minimum outer diameter to the desired substantially constant outer diameter.

All publications and patent applications mentioned in the specification are indicative of the level of those skilled in the art to which this invention pertains. All publications and patent applications are herein incorporated by reference to the same extent as if each individual publication or patent application was specifically and individually indicated to be incorporated by reference.

Although the foregoing invention has been described in some detail by way of illustration and example for purposes of clarity of understanding, certain changes and modifications may be practiced within the scope of the appended claims.

What is claimed is:

1. A joint restraint configured to selectively mount to a portion of a pipe, wherein the pipe is irregularly shaped and has a maximum outer diameter that differs from a desired substantially constant outer diameter that is configured for receipt within a socket, the joint restraint comprising:
   a circumferential ring body surrounding a central axis and having an inner surface, an opposed outer surface, and opposed first and second surfaces that extend between the respective inner and outer surfaces, wherein the inner surface of the ring body defines an inner diameter that is greater than the maximum outer diameter of the pipe, and wherein the ring body defines a plurality of bores that extend radially between the inner and outer surfaces relative to the central axis, wherein the plurality of bores are spaced circumferentially about the opposed inner and outer surfaces;
   a plurality of bolts, wherein each bore of the ring body is configured to receive a respective bolt of the plurality of bolts, wherein each bolt is configured for selective radial movement relative to the central axis to apply a mechanical load to an outer surface of the pipe;
   a plurality of jacking assemblies secured to a portion of the first surface of the ring body, each jacking assembly comprising:
      a frame defining an aperture that extends radially relative to the central axis; and
      a jacking bolt,
      wherein the aperture of the frame is configured to receive the jacking bolt, wherein the jacking bolt is selectively radially moveable relative to the central axis to deform the pipe proximate the maximum outer diameter of the pipe to selectively urge an outer surface of the pipe to the desired substantially constant outer diameter.

2. The system of claim 1, wherein the plurality of jacking assemblies comprises at least one pair of opposed jacking assemblies, and wherein the jacking assemblies of each pair of opposed jacking assemblies are positioned in circumferential opposition to one another about the circumferential ring body.

3. The joint restraint of claim 2, wherein the at least one pair of opposed jacking assemblies comprises a plurality of pairs of opposed jacking assemblies.

4. The joint restraint of claim 2, wherein each pair of opposed jacking assemblies comprises a first jacking assembly and an opposed second jacking assembly, wherein the first jacking assemblies of the plurality of pairs of opposed jacking assemblies are spaced along a first arc segment of the ring body that defines a first central angle at the central axis of the ring body, wherein the second jacking assemblies of the plurality of pairs of opposed jacking assemblies are spaced along a second arc segment of the ring body that defines a second central angle at the central axis of the ring body, and wherein the first and second central angles are less than about 45 degrees.

5. The joint restraint of claim 1, wherein the frames of the plurality of jacking assemblies are integrally formed to a portion of the first surface of the ring body.

6. The joint restraint of claim 1, wherein the ring body defines a plurality of slots that extend between the opposed first and second surfaces of the ring body, wherein each slot of the plurality of slots is configured to receive a corresponding fastener.

7. The joint restraint of claim 6, wherein the plurality of slots are spaced circumferentially about the opposed first and second surfaces.

8. The joint restraint of claim 1, further comprising a gasket configured to be positioned onto the pipe.

9. The joint restraint of claim 1, further comprising a plurality of inserts, wherein each insert of the plurality of inserts is configured for receipt within a respective bore of the plurality of bores of the ring body, and wherein each bolt of the plurality of bolts is configured to apply a mechanical load to a corresponding insert to transmit force to the outer surface of the pipe.

10. A method for deforming an outer diameter of an irregularly shaped pipe for insertion into a socket, comprising:
   positioning a joint restraint onto an outer surface of the pipe proximate a maximum outer diameter of the pipe, wherein the maximum outer diameter of the pipe differs from a desired substantially constant outer diameter that is configured for receipt within a socket, the joint restraint comprising:
      a circumferential ring body surrounding a central axis and having an inner surface, an opposed outer surface, and opposed first and second surfaces that extend between the respective inner and outer surfaces, wherein the inner surface of the ring body defines an inner diameter that is greater than the maximum outer diameter of the pipe, and wherein the ring body defines a plurality of bores that extend radially between the inner and outer surfaces relative to the central axis;
      a plurality of bolts;

a plurality of jacking assemblies secured to a portion of the first surface of the ring body, each jacking assembly comprising:
a frame defining an aperture that extends radially relative to the central axis; and
a jacking bolt;
positioning a gasket onto at least a portion of the pipe;
positioning the jacking bolt of each jacking assembly within the aperture of the frame of the jacking assembly;
selectively moving the jacking bolt of each jacking assembly radially inwardly relative to the central axis to deform the pipe proximate the maximum outer diameter of the pipe to urge an outer surface of the pipe to the desired substantially constant outer diameter; and
inserting a distal end portion of the pipe into the socket;
positioning at least a portion of the gasket within the socket; and
selectively moving each bolt of the plurality of bolts radially inwardly relative to the central axis to transmit force to the outer surface of the pipe.

11. The method of claim 10, wherein the distal end portion of the pipe defines a distal end of the pipe, and wherein the joint restraint is placed between about 1 to about 10 inches from the distal end of the pipe.

12. The method of claim 10, wherein the plurality of jacking assemblies comprises at least one pair of opposed jacking assemblies, and wherein the jacking assemblies of each pair of opposed jacking assemblies are positioned in circumferential opposition to one another about the circumferential ring body.

13. The method of claim 12, wherein the at least one pair of opposed jacking assemblies comprises a plurality of pairs of opposed jacking assemblies.

14. The method of claim 10, wherein the socket is defined by a pipe element selected from the group consisting of a pipe and a fitting.

15. The method of claim 10, wherein the ring body defines a plurality of slots that extend between the opposed first and second surfaces of the ring body, and wherein the method further comprises positioning a fastener within each respective slot of the plurality of slots.

16. The method of claim 15, wherein the socket is defined by a pipe element selected from the group consisting of a pipe and a fitting, wherein at least a portion of the gasket is positioned between the circumferential ring body and a portion of the pipe element defining the socket, and wherein the method further comprises advancing the fastener within each respective slot of the plurality of slots to compress the gasket between the circumferential ring body and the pipe element.

17. The method of claim 10, wherein the joint restraint further comprises a plurality of inserts, wherein the method further comprises positioning each insert of the plurality of inserts within a respective bore of the plurality of bores of the ring body, wherein each bolt of the plurality of bolts is moved radially inwardly relative to the central axis to apply a mechanical load to a corresponding insert to transmit force to the outer surface of the pipe.

18. The method of claim 10, wherein the pipe has a minimum outer diameter that differs from a desired substantially constant outer diameter, wherein the deformation of the pipe proximate the maximum outer diameter of the pipe urges the outer surface of the pipe proximate the maximum outer diameter to the desired substantially constant outer diameter, and wherein the deformation of the pipe proximate the minimum outer diameter of the pipe urges the outer surface of the pipe proximate the minimum outer diameter to the desired substantially constant outer diameter.

19. A joint restraint configured to selectively mount to a portion of a pipe, wherein the pipe is irregularly shaped and has a maximum outer diameter that differs from a desired substantially constant outer diameter that is configured for receipt within a socket, the joint restraint comprising:
a circumferential ring body surrounding a central axis and having an inner surface, an opposed outer surface, and opposed first and second surfaces that extend between the respective inner and outer surfaces, wherein the inner surface of the ring body defines an inner diameter that is greater than the maximum outer diameter of the pipe, and wherein the ring body defines a plurality of bores that extend radially between the inner and outer surfaces relative to the central axis, wherein the ring body defines a plurality of slots that extend between the opposed first and second surfaces of the ring body, wherein each slot of the plurality of slots is configured to receive a corresponding fastener;
a plurality of bolts, wherein each bore of the ring body is configured to receive a respective bolt of the plurality of bolts, wherein each bolt is configured for selective radial movement relative to the central axis to apply a mechanical load to an outer surface of the pipe;
a plurality of jacking assemblies secured to a portion of the first surface of the ring body, each jacking assembly comprising:
a frame defining an aperture that extends radially relative to the central axis; and
a jacking bolt,
wherein the aperture of the frame is configured to receive the jacking bolt, wherein the jacking bolt is selectively radially moveable relative to the central axis to deform the pipe proximate the maximum outer diameter of the pipe to selectively urge an outer surface of the pipe to the desired substantially constant outer diameter.

* * * * *